(12) United States Patent
Li (10) Patent No.: US 7,471,292 B2
(45) Date of Patent: Dec. 30, 2008

(54) VIRTUAL VIEW SPECIFICATION AND SYNTHESIS IN FREE VIEWPOINT

(75) Inventor: Baoxin Li, Chandler, AZ (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/462,327

(22) Filed: Aug. 3, 2006

(65) Prior Publication Data

US 2007/0109300 A1 May 17, 2007

Related U.S. Application Data

(60) Provisional application No. 60/737,076, filed on Nov. 15, 2005.

(51) Int. Cl.
*G06T 15/20* (2006.01)
*G06T 15/00* (2006.01)
*G06T 15/50* (2006.01)

(52) U.S. Cl. .................. 345/427; 345/419; 345/426

(58) Field of Classification Search ............... 345/426, 345/427
See application file for complete search history.

(56) References Cited

U.S. PATENT DOCUMENTS

| | | | | |
|---|---|---|---|---|
| 5,963,664 A * | 10/1999 | Kumar et al. | ............... | 382/154 |
| 6,266,068 B1 * | 7/2001 | Kang et al. | ............... | 345/629 |
| 6,353,678 B1 * | 3/2002 | Guo et al. | ............... | 382/154 |
| 6,571,024 B1 * | 5/2003 | Sawhney et al. | ............ | 382/294 |
| 6,573,912 B1 * | 6/2003 | Suzuki et al. | ............... | 715/757 |
| 6,668,080 B1 * | 12/2003 | Torr et al. | .................. | 382/173 |
| 6,771,303 B2 * | 8/2004 | Zhang et al. | ............ | 348/14.16 |
| 6,803,912 B1 * | 10/2004 | Mark et al. | ................. | 345/427 |
| 6,853,398 B2 * | 2/2005 | Malzbender et al. | ..... | 348/14.09 |
| 6,864,903 B2 * | 3/2005 | Suzuki | ........................ | 715/757 |
| 6,992,702 B1 * | 1/2006 | Foote et al. | .............. | 348/211.8 |
| 7,054,491 B2 * | 5/2006 | McGuinness et al. | ....... | 382/209 |
| 7,085,409 B2 * | 8/2006 | Sawhney et al. | ............ | 382/154 |
| 7,277,118 B2 * | 10/2007 | Foote | .......................... | 348/36 |
| 2002/0012459 A1 * | 1/2002 | Oh | .............................. | 382/154 |

(Continued)

FOREIGN PATENT DOCUMENTS

EP 1785941 A1 * 5/2007

(Continued)

OTHER PUBLICATIONS

Liu, X. et al., "A hybrid method of image synthesis in IBR for novel viewpoints", Proceedings of the ACM Symposium on Virtual Reality Software and Technology (Seoul, Korea, Oct. 22-25, 2000), VRST '00, ACM Press, NY, NY, pp. 55-60.*

(Continued)

*Primary Examiner*—Ulka Chauhan
*Assistant Examiner*—Roberta Prendergast
(74) *Attorney, Agent, or Firm*—Chernoff, Vilhauer, McClung & Stenzel (57) ABSTRACT

A system that receives a first video stream of a scene having a first viewpoint and a second video stream having a second viewpoint wherein camera calibration between the first viewpoint and the second viewpoint is unknown. A viewer selects a viewer viewpoint generally between the first viewpoint and the second viewpoint, and the system synthesizes the viewer viewpoint based upon the first video stream and the second video stream.

18 Claims, 7 Drawing Sheets

U.S. PATENT DOCUMENTS

| | | | |
|---|---|---|---|
| 2002/0061131 A1* | 5/2002 | Sawhney et al. | 382/154 |
| 2002/0122113 A1 | 9/2002 | Foote | 348/48 |
| 2002/0158873 A1* | 10/2002 | Williamson | 345/427 |
| 2003/0030638 A1* | 2/2003 | Astrom et al. | 345/420 |
| 2003/0095711 A1* | 5/2003 | McGuinness et al. | 382/209 |
| 2003/0197779 A1* | 10/2003 | Zhang et al. | 348/14.16 |
| 2003/0231179 A1* | 12/2003 | Suzuki | 345/423 |
| 2004/0239763 A1* | 12/2004 | Notea et al. | 348/169 |
| 2004/0240725 A1* | 12/2004 | Xu et al. | 382/154 |
| 2004/0247173 A1* | 12/2004 | Nielsen et al. | 382/154 |
| 2005/0185711 A1* | 8/2005 | Pfister et al. | 375/240.01 |
| 2005/0286756 A1* | 12/2005 | Hong et al. | 382/154 |
| 2006/0056727 A1* | 3/2006 | Jones et al. | 382/276 |
| 2006/0066612 A1* | 3/2006 | Yang et al. | 345/419 |
| 2006/0125921 A1* | 6/2006 | Foote | 348/159 |
| 2006/0146138 A1* | 7/2006 | Xin et al. | 348/207.99 |
| 2006/0146141 A1* | 7/2006 | Xin et al. | 348/211.7 |
| 2006/0146143 A1* | 7/2006 | Xin et al. | 348/218.1 |

FOREIGN PATENT DOCUMENTS

| | | |
|---|---|---|
| WO | WO 2007/061495 A2 | 5/2007 |

OTHER PUBLICATIONS

Bon-Woo Hwang; Seong-Whan Lee; "Reconstruction of partially damaged face images based on a morphable face model", IEEE Transactions on Pattern Analysis and Machine Intelligence, vol. 25, Issue 3, Mar. 2003, pp. 365-372.*

Gangyi Jiang et al., "New method of ray-space interpolation for free viewpoint video", IEEE International Conference on Image Processing, ICIP 2005, vol. 2, Sep. 11-14, 2005, pp. II-1138-1141.*

Gong et al., "Camera Field Rendering", University of Alberta (Canada), Technical Report: TR02-08.pdf, May 23, 2002, pp. 1-22.*

Gong, M.; Yee-Hong Yang; "Fast stereo matching using reliability-based dynamic programming and consistency constraints", Proceedings Ninth IEEE International Conference on Computer Vision, 2003, pp. 610-617.*

Minglun Gong; Yee-Hong Yang; "Multi-resolution stereo matching using genetic algorithm", Proceedings. IEEE Workshop on Stereo and Multi-Baseline Vision, (SMBV 2001), Dec. 9-10, 2001, pp. 21-29.*

M. Gong and Y.H. Yang, Camera field rendering for static and dynamic scenes, Graphical Models 67 (Mar. 2005), ACM, pp. 73-99.*

Izquierdo, E.; "Computational experiments with area-based stereo for image-based rendering", Proceedings First International Symposium on 3D Data Processing Visualization and Transmission, Jun. 19-21, 2002, pp. 168-171.*

Kimata, H. et al., "System design of free viewpoint video communication", The Fourth International Conference on Computer and Information Technology, CIT '04, Sep. 14-16, 2004, pp. 52-59.*

Liangzhong Fan, et al., "Ray space interpolation based on its inherent characteristics", 2004 IEEE Region 10 Conference, TENCON 2004, vol. A, Nov. 21-24, 2004, pp. 375-378.*

Tanimoto, M.; "FTV (free viewpoint television) creating ray-based iamge engineering", IEEE International Conference on Image Processing. ICIP 2005, vol. 2, Sep. 11-14, 2005, pp. II-25-28.*

Xu, Y. and Yang, Y., "Object representation using 1D displacement mapping", Proceedings of Graphics interface 2004, May 17-19, 2004, ACM International Conference Proceedings Series, vol. 62, Canadian Human-Computer Communications Society, School of Computer Science, University of Waterloo, Waterloo, Ontario, pp. 33-40.*

Yong-Suk Kim; Kyu-Phil Han; Eung-Joo Lee; Yeong-Ho Ha; "Robust 3-D depth estimation using genetic algorithm in stereo image pairs", IEEE Asia Pacific Conference on Circuits and Systems, Nov. 18-21, 1996, pp. 357-360.*

Wei Zhang; Quanbing Zhang; Lei Qu; Sui Wei; "A stereo matching algorithm based on multiresolution and epipolar constraint", Proceedings Third International Conference on Image and Graphics, Dec. 18-20, 2004, pp. 180-183.*

M. Pollefeys, "Self-calibration and metric 3D reconstruction from uncalibrated image sequences", Ph.D. Thesis, Dept. of Electrical Engineering, ESAT-PSI, K.U.Leuven, 1999, Scientific Prize BARCO 1999, 240 pages.*

Fusiello, A.; Caldrer, S.; Ceglie, S.; Matthern, N.; Murino, V.; "View synthesis from uncalibrated iamges using parallax", Proceedings 12th International Conference on Image Analysis and Processing, Sep. 17-19, 2003, pp. 146-151.*

Mei Han; Kanade, T.; "Multiple motion scene reconstruction with uncalibrated cameras", IEEE Transactions on Pattern Analysis and Machine Intelligence, vol. 25, Issue 7, Jul. 2003, pp. 884-894.*

Ito, Y.; Saito, H.; "Free-viewpoint image synthesis from multiple-view images taken with uncalibrated moving cameras", IEEE International Conference on Image Processing, ICIP 2005, vol. 3, Sep. 11-14, 2005, pp. III-29-32.*

Koch, R.; Pollefeys, M.; Van Gool, L.; "Automatic 3D model acquisition from uncalibrated image sequences", Proceedings Computer Graphics International, Jun. 22-26, 1998, pp. 597-604.*

Koch, R.; Pollefeys, M.; Heigl, B.; Van Gool, L.; Niemann, H.; "Calibration of hand-held camera sequences for plenoptic modeling", The Proceedings of the Seventh IEEE International Conference on Computer Vision, vol. 1, Sep. 20-27, 1999, pp. 585-591.*

Koch, R.; Pollefeys, M.; Luc Van Gool; "Realistic 3-D scene modeling from uncalibrated image sequences", Proceedings 1999 International Conference on Image Processing. ICIP 99, vol. 2, Oct. 24-28, 1999, pp. 500-504.*

Pollefeys, M.; van Gool, L.; "Stratified self-calibration with the modulus constraint", IEEE Transactions on Pattern Analysis and Machine Intelligence, vol. 21, Issue 8, Aug. 1999, pp. 707-724.*

Yaguchi, S.; Saito, H.; "Arbitrary viewpoint video synthesis from multiple uncalibrated cameras", IEEE Transactions on Systems, Man, and Cybernetics, Part B, vol. 34, Issue 1, Feb. 2004, pp. 430-439.*

Lingxiang Zhou; Weikang Gu; "Motion and structure from an uncalibrated moving camera", 1998 Fourth International Conference on Signal Processing Proceedings, ICSP '98, vol. 2, Oct. 12-16, 1998, pp. 873-876.*

Sang Yoon Park et al., "Segmentation based disparity estimation using color and depth information", 2004 International Conference on Image Processing, ICIP '04, vol. 5, Oct. 24-27, 2004, pp. 3275-3278.*

Zokai, et al., "Multiview Paraperspective Projection Model for Diminished Reality", Proceedings of the 2nd IEEE/ACM international Symposium on Mixed and Augmented Reality, Oct. 7-10, 2003, IEEE Computer Society, Washington, DC, 10 pages.*

European Search Report for European Patent Application No. 06023473.9 based on U.S. Appl. No. 11/462,327, Mailed Jan. 30, 2007.

S. Pollard, M. Pilu, S. Hayes and A. Lorusso, "View Synthesis by Trinocular Edge Matching and Transfer", Applications of Computer Vision, 1988, WACV '98, Proceedings Fourth IEEE Workshop on Princeton, NJ, USA Oct. 19-21, 1998, Los Alamitos, CA, USA, IEEE Comput. Soc., US. pp. 168-173.

* cited by examiner

FIG. 1

Color segmentation and disparity maps of the monkey scene and the snoopy scene.

Top row: original images.

Center row: color-based segmentation results shown as pseudo colors.

Botton row: computed disparity maps.

FIG. 2

Virtual view after forward warping with original two basis views on the top row.

FIG. 3

A complete virtual view after the entire process.

FIG. 4

Virtual view specification: A mockup illustrating the main idea.

FIG. 5

The virtual view as a function of the basis views through two parameters α and γ, which can be controlled by the left-right and up-down arrows of FIG. 5 respectively.

FIG. 6

Simulated virtual viewpoint moving path.
The dots are the given camera positions.

FIG. 7

Synthesized and basis views.
Left column: monkey scene. Right column: Snoopy scene.

FIG. 8

VIRTUAL VIEW SPECIFICATION AND SYNTHESIS IN FREE VIEWPOINT

CROSS-REFERENCE TO RELATED APPLICATIONS

This application claims the benefit of 60/737,076 filed Nov. 15, 2005.

BACKGROUND OF THE INVENTION

The present invention relates to determining a virtual viewpoint television.

Television is likely the most important visual information system in past decades, and it has indeed become a commodity of modern human life. With a conventional TV, the viewer's viewpoint for a particular video is determined and fixed by that of the acquisition camera. Recently, a new technology has emerged, free viewpoint television (FTV), which promises to bring a revolution to TV viewing. The premise of FTV is to provide the viewer the freedom of choosing his/her own viewpoint for watching the video by providing multiple video streams captured by a set of cameras. In addition to home entertainment, the FTV concept can also be used in other related domains such as gaming and education. The user-chosen viewpoint(s) does not need to coincide with those of the acquisition cameras. Accordingly, the FTV is not merely a simple view change by switching cameras (as possible with some DVD for a couple of preset views). The FTV technology requires a whole spectrum of technologies ranging from acquisition hardware, coding technology, bandwidth management techniques, standardization for interoperability, etc. One of the particular technologies to implement FTV is virtual view synthesis.

The essence of virtual view synthesis includes given a set of images (or video) acquired from different viewpoints to construct a new image that appears to be acquired from a different viewpoint. This multiple image modification is also sometimes referred to as image-based rendering (IBR).

In the FTV application, it is unlikely that the camera calibration information is likely to be available (e.g., imagine shooting a movie with multiple cameras which need to be calibrated each time they are moved). This renders IBR methods requiring full camera calibration generally inapplicable in most cases. Moreover, before virtual view synthesis, the virtual view should to be specified. Existing IBR techniques use a variety of way to achieve this. For example, the virtual view specification may be straightforward when the entire setup is fully calibrated. For example, the virtual view specification may be based on the user's manual picking of some points including the projection of the virtual camera center. None of these approaches is readily applicable to the FTV application with uncalibrated cameras, where an ordinary user needs an intuitive way of specifying some desired (virtual) viewpoints.

What is desirable is a framework for the rendering problem in FTV based on IBR. The approach preferably includes multiple images from uncalibrated cameras as the input. Further, while a virtual view is synthesized mainly from two principal views chosen by a viewer, other views may also be employed to improve the quality. Starting with two optimal (user-chosen) views also contributes to the reduction in the number of required views. In addition a technique for specifying the virtual view in uncalibrated cameras is desirable, and thus providing a practical solution to view specification in the FTV application without requiring either full camera calibration or complicated user interaction, both of which are all impractical for FTV.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

The preferred embodiment to the rendering solution should not merely involve mathematical rendering techniques but also be modeled in such a manner to reflect a perspective on how the FTV application should configure the entire system including how (ideally) cameras should be positioned and how a user should interact with the rendering system.

In most cases multiple synchronized views of the same scene are captured by a set of fixed but otherwise un-calibrated cameras. In practice, moving cameras pose no theoretical problem if the weak calibration is done for every frame. Practically, it may be assumed that the cameras are fixed at least for a video shot and thus the weak calibration is needed only for each shot. In most cases multiple video streams are available to a viewer. The viewer specifies a virtual viewpoint and requests that the system generates a virtual video corresponding to that viewpoint.

In a typical IBR approach, since no explicit 3D reconstruction and re-projection is typically performed, in general the same physical point may have a different color in the virtual view than from any of the given views, even without considering occlusion. The differences among different views can range from little to dramatic, depending on the viewing angles, the illumination and reflection models, etc. Therefore, the IBR approach should preferably include a limitation that the virtual views should not be too far from the given views, otherwise unrealistic color may entail.

With this consideration, one may further assume that the cameras used in a FTV program are located strategically so that the most potentially interesting viewpoint should lie among the given views. For the convenience of a viewer, this can be simplified to the following: the virtual view is defined as one between any two (or more) user-chosen views from the given multiple ones (two or more). The choice of the two views can be quite intuitive and transparent in practice: for example, a viewer may feel that view 1 is too far to-the-left than desired, while view 2 is too far to-the right than desired; then the desired virtual view should be somewhere generally between view 1 and view 2.

Thus, the system may solve the following two aspects to support the FTV application (1) given the multiple video streams from uncalibrated cameras and any two (or more) user-chosen views, synthesize a virtual view generally between the two (or more) views; and (2) provide the viewer an intuitive way of specifying the virtual viewpoint in relation to the given available views.

As defined above, one may have a set of video streams with two that are the closest to the user's desired viewpoint. In an uncalibrated system, the notion of closest may not be well defined, and accordingly, the user may select the pair of views. It is desirable to make maximum use of the two specified views although other views (user selected or not) can likewise be used. For identification purposes, one may refer to the two user-chosen views as the basis images. The basis images are dynamically selected based on the user's choice and not specifically based upon specially positioned cameras.

The particular preferred approach to virtual view synthesis consists of the following steps:

1. Pair-wise weak calibration of all views to support potentially any pair that a viewer may choose. The calibration may exclude some views, especially if one view is generally between a pair of other views.
2. Color-segmentation-based correspondence between the two basis views, where other views are taken into consideration, if desired.
3. Forward warping from basis views to the virtual view with a disparity map.
4. For unfilled pixels, use an algorithm to do backward search on auxiliary views to find a dominant and disparity consistent color.

Virtual View Syntheses Via Weak Calibration

Figure 1:
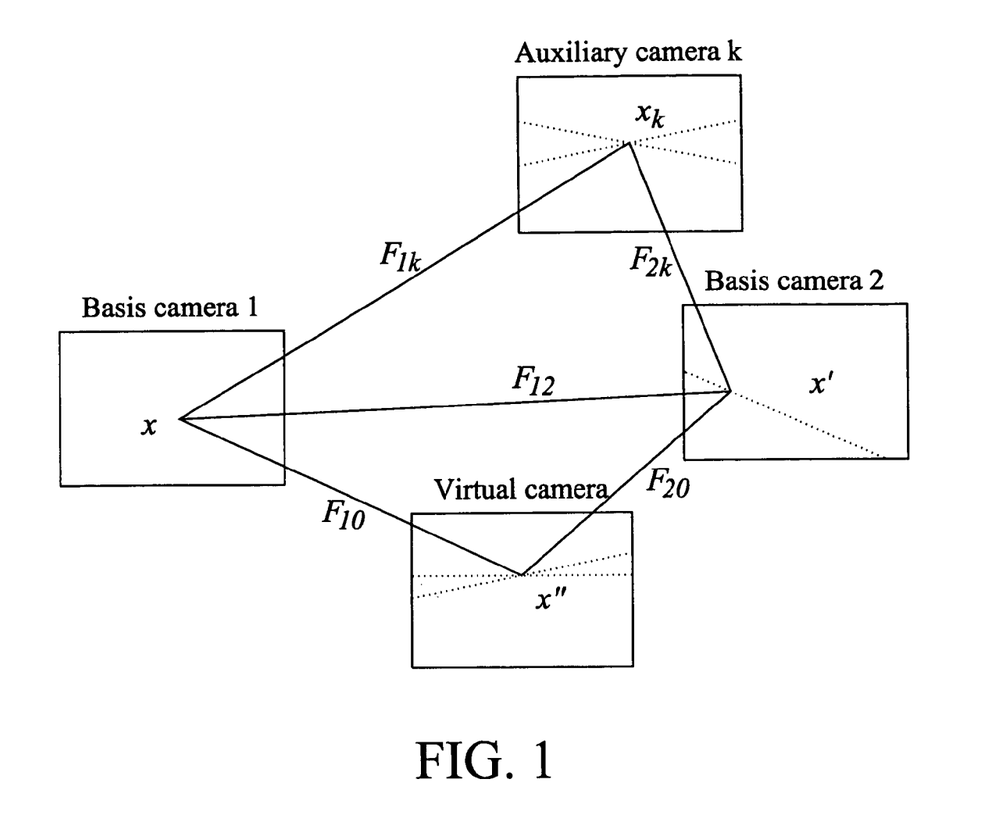
FIG. 1 illustrates a camera layout.

The system may be based upon using n cameras in the system. The basis views may be denoted as basis camera 1 and basis camera 2. The remaining views may be denoted as auxiliary cameras 3 to n. Fundamental matrices between the basis and the auxiliary cameras are calculated with feature detector and the random sample consensus (i.e., RANSAC) algorithm denoted as $F_{13}, F_{23}, \ldots F_{1n}, F_{2n}$. The fundamental matrix between the basis cameras is $F_{12}$. Computation of fundamental matrices need only be done once unless the cameras are moved. The fundamental matrices between the basis and the virtual views are denoted as $F_{10}$ and $F_{20}$, respectively.

With fundamental matrices determined, for any point x in camera 1, its corresponding point in camera 2, x', is constrained via the fundamental matrix by $x'^T F_{12} x = 0$, which can be used to facilitate the search for the disparity d. A third corresponding point in an auxiliary camera k is denoted by $x_k$ which is determined from $x_k^T F_{1k} x = 0$ and $x_k^T F_{2k} x' = 0$. Once the correspondence between x and x' is determined, a virtual view pixel x" can be determined by forward mapping, where x" satisfies both $x"^T F_{10} x = 0$ and $x"^T F_{20} x' = 0$. These relationships are illustrated in FIG. 1.

Segmentation Based Correspondence

Even with the epipolar constraint described above, it is still desirable to search along an epipolar line for the disparity for a given point x. To establish the correspondence between x and x', one may first use graph-cut-based segmentation to segment each of the basis views. For all pixels within each segment, one may assume that they have the same disparity, i.e. on the same front parallel plane. Over-segmentation is favored for more accurate modeling, and each segment is limited to be no wider and higher than 15 pixels, which is a reasonable value for a traditional NTSC TV frame with pixel resolution of 720×480.

Each segment may be warped to another image by the epipolar constraint described above (also see FIG. 1). Instead of using the sum-of-squared-difference (SSD), or sum-of-absolute-difference (SAD) criteria as matching scores, it is simpler to count the number of corresponding pixel pairs whose relative difference (with respect to the absolute value) is less than 0.2 (i.e.$|R_1-R_2|/R_1<0.2$, similar for G and B), and this number, normalized by the number of pixels in the segment, is used as the matching score, denoted $m_{ij}(d)$ for any possible d and for j-th segment in basis image i. This measure was found to be robust to lighting condition.

In addition to using the matching score from the other basis image, one may incorporate all the auxiliary images by computing the final matching score for a segment $S_j$ in basis image i (denoted as $S_{ij}$) with disparity d as $$m_{ij}(d) = \max_k \{m_{jk}(d)\} \tag{1}$$

where $m_{ijk}(d)$ is the matching score of segment $S_{ij}$ in any other basis or auxiliary camera k. Note that, the d is for the basis views, and searching in other auxiliary views is equivalent to checking which d is able to give arise to the most color consistency among the views whose relation is given in FIG. 1.

Furthermore, instead of deciding on a single d based on the above matching score, one may use that score in the following iterative optimization procedure. The basic technique is to update the matching score of each color segment based on its neighboring segments of similar color in order to enforce disparity smoothness:

$$S_{ij}^0(d) = m_{ij}(d) \tag{2}$$

$$r_{ij}^k(d) = \sum_{\phi} \sum_{d_0 \in (d-\Delta, d+\Delta)} S_{ij}^k(d_0)$$

$$S_{ij}^{k-1}(d) = S_{ij}^0(d) \left( \frac{r_{ij}^k(d)}{\sum_{d \in (d_{min}, d_{max})} r_{ij}^k(d)} \right)^\beta$$

where $\phi$ is the set of neighbor segments with similar color (defined by Euclidian color distance under a pre-determined threshold), $\beta$ is the inhibition constant (set to 2 for computational simplicity) controlling the convergence speed, and k the iteration index. The system may use the following stopping criteria: at any iteration k, if for any d, $S_{ij}$ exceeds the threshold, the updating process for this segment will stop at next iteration; the entire procedure will terminate until it converges (i.e., no segments need to be updated). The technique typically converges after 10 iterations and thus we fix the number of iteration to 10.

Figure 2:
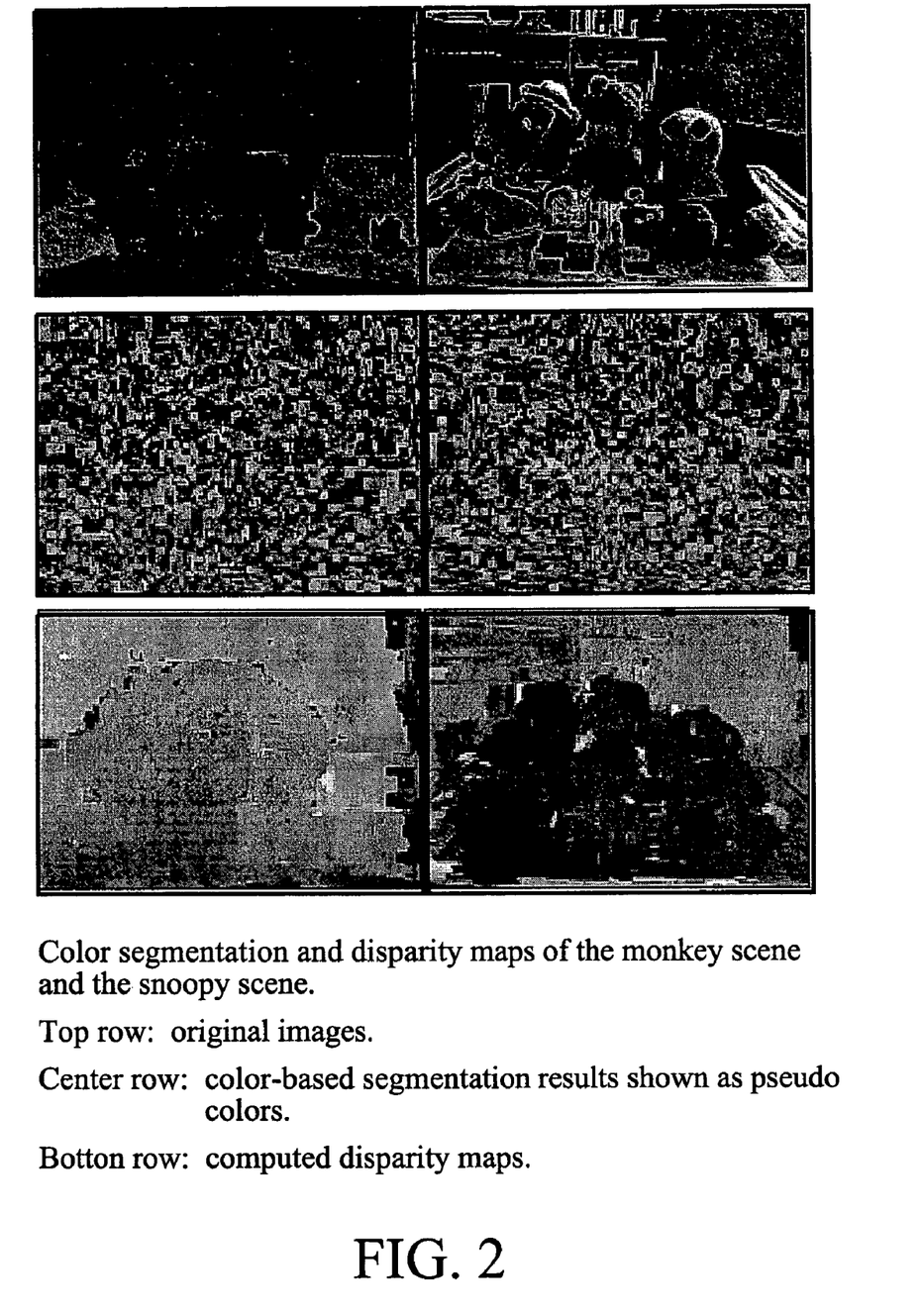
FIG. 2 illustrates color segmentation and disparity maps.

The above procedure is performed for both basis views, and the disparity map is further verified by left-right consistency check, and only those segments with consistent results are used for synthesizing the virtual view (thus some segments may not be used, resulting in an incomplete disparity map). In FIG. 2, two examples are shown of the color-segmentation results together with the resultant disparity map.

Forward Warping

Figure 3:
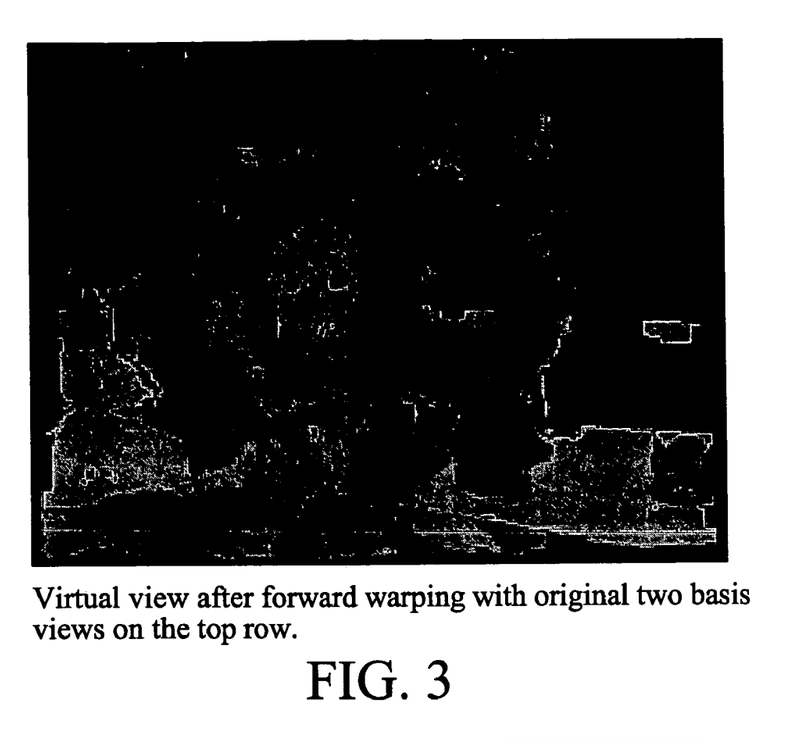
FIG. 3 illustrates virtual view after forward warping.

Using the verified disparity map and the two basis views, an initial estimate of the virtual view can be synthesized by forward warping. For a pixel x in basis view 1 and x' in basis view 2, their corresponding pixel on the virtual view will be x" whose color is computed as $$RGB(x") = (1-\alpha)RGB(x) + \alpha RGB(x') \qquad (3)$$

with α being a coefficient controlling the contribution of the basis views (which may be set to the same α to be defined elsewhere). Forward warping can preserve well texture details and it can easily be implemented in hardware, making real-time rendering easier. FIG. 3 shows an intermediate image obtained after forward warping.

Backward Searching and Propagation

In the initial virtual view given by forward warping, it is not uncommon to see many uncovered pixels, which may be denoted as "black holes". These black holes are due to incomplete disparity map, such as occlusions. For each black-hole pixel, one may check its neighbor for a pixel that has been assigned a color value from the initial synthesis. The disparity of that pixel is then used for backward search on the images. Unlike other similar disparity or depth searching algorithms that do exhaustive search on the entire disparity space, the preferred system searches within a limited range within the disparity of the "valid" neighbors (those with assigned color). The search objective function is defined as:

$$F(d) = \min_{d \in [d_n - \Delta, d_n + \Delta]} \{\lambda \cdot Dist_{color}(p_{d_n}, \overline{p}) + (1-\lambda) \cdot Dist_{disp}(d_n, d)\} \qquad (4)$$

where $d_n$ is the disparity of a valid neighbor pixel and $p_{d_n}$ is its color; $\overline{p} = \{p_1, p_2\}$ are colors from two basis views corresponding to d; $Dist_{disp}$ and $Dist_{color}$ are two distance functions defined on disparity and color; and λ is a weight coefficient. The combination of the differences of color and the disparity is intended for the smoothness of both texture (color) and depth. In reality, F(d) is set as the minimum one obtained from all the valid neighbor pixels. A new disparity will be accepted only when the resulting F(d) is below a predetermined value. If the search fails after all possible d is tested on all valid neighbors, the corresponding pixel is left empty until propagation is reached from other pixels. Otherwise it is assigned a color based on the blending method of equation (3) and is denoted as valid. A new search then continues for other black-hole pixels.

Even after the search and propagation processes, there may still be "black holes" left when the points cannot be seen in both basis cameras. To address this, the same search and propagation method as described above may be used but with $\overline{p} = \{p_i\}$, i≠1,2. This means that one may assume that the pixel may be (for example) occluded in either or both of views and thus both of them are excluded. But one may be able to obtain the information from other views. Since there is no information for any preference for any of the auxiliary views, a dominant color found from the views is taken to fill the black holes. While it may appear to be computationally expensive to search in multiple images if the number of views n is large, considering that the number of uncovered pixels is relatively small after the previous steps, this search is quite fast in practice.

It should be noted that there is no guarantee that all pixels can be covered by the above procedure. For example, the problem may be caused by a few isolated noisy pixels, or maybe the scene is not covered by all the cameras. A linear interpolation can handle the former situation while the latter situation can be alleviated by constraining the free viewpoint range, which is already part of the preferred assumption (i.e., the virtual view is always between two views, and the cameras are strategically positioned).

Viewpoint Specification

Figure 4:
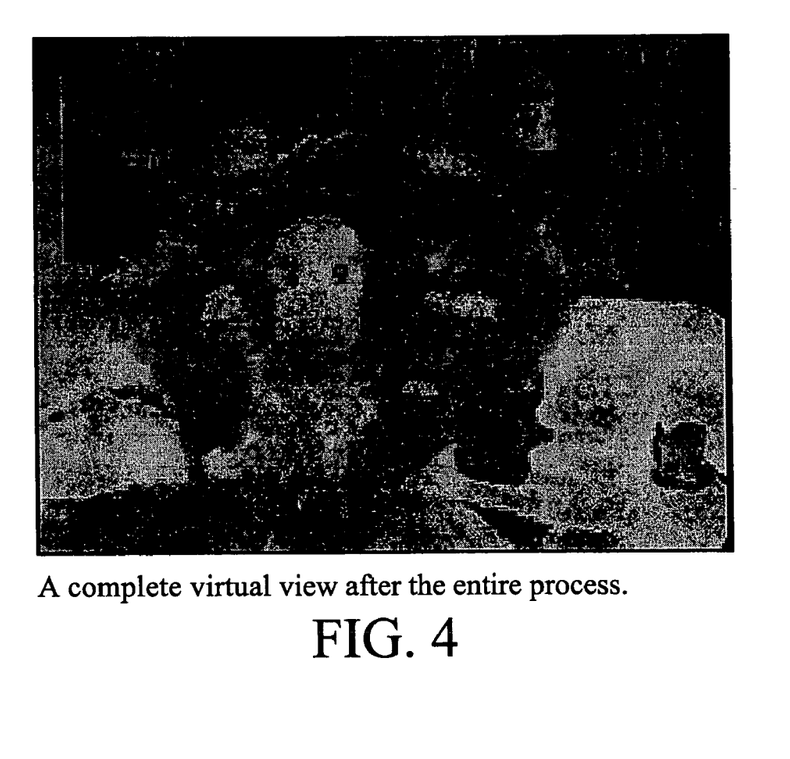
FIG. 4 virtual view after processing.

A complete virtual view obtained by following the preferred entire process is shown in FIG. 4. An intuitive way for virtual view specification based on only uncalibrated views is desirable. Essentially, the technique provides a viewer with the capability of varying a virtual view gradually between any two chosen views. The virtual view can thus be determined by, for example, conveniently pushing a +/− button (or similar) until the desired viewpoint is shown, similar to controlling color or contrast of a TV picture via a remote control button (similarly, a joystick on remote or a game console can be used for implementation).

Figure 5:
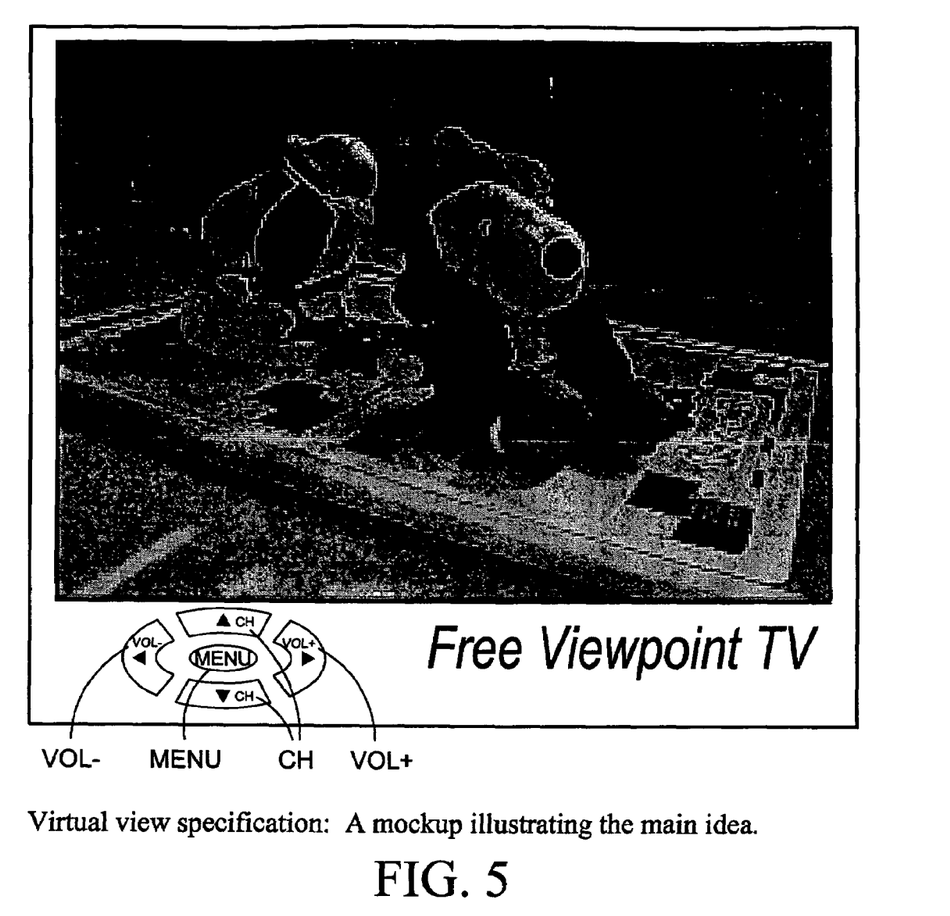
FIG. 5 illustrates an interface.

A viewpoint can be specified by a translation vector and a rotation matrix with respect to any given view to determine its position and direction. But it is unrealistic to ask a TV viewer to do this. A practical method is to start with a real view and let the viewer move to a desired viewpoint in reference to that view. This relative viewpoint moving, in an interactive manner, is much more convenient for the user. Thus the system should permit interpreting continuous virtual views from one view to another. The interpolation can be controlled by a single parameter α. When α=0, the basis view 1 is the current view; and with α increasing to 1, the viewpoint changes gradually to another view 2. A mockup user interface is illustrated in FIG. 5 for an illustration, where the left-right arrow buttons control the viewpoint change from two underlying basis views, and the result is shown immediately on the screen as visual feedback to the viewer. The system may also display the two basis views on the screen as well. The up-down arrow buttons can add variability of the views along a path between the two basis views, as explained later.

Viewpoint Interpolation with Calibrated Image Capture

We begin with the calibrated case as it is instructive, although the ultimate goal is to deal with the uncalibrated case. The preferred interface is similar to that shown in FIG. 5 to support intuitive virtual view specification. Suppose one has two camera matrices for the two basis views respectively:

$$P_1 = K_1 R_1 [I | -C_1], P_2 = K_2 R_2 [I | -C_2] \qquad (5)$$

For this case, one is typically only concerned with only relative relationship between the two views. By applying the following homography transform to each of the projection matrices, $$P_i' = P_i H$$

where $$H = H_c H_R, H_c = \begin{bmatrix} I & C_1 \\ 0^T & 1 \end{bmatrix}, H_R = \begin{bmatrix} R_1^{-1} & 0 \\ 0^T & 1 \end{bmatrix} \qquad (6)$$

one converts the cameras to canonical form as:

$$\begin{cases} P'_1 = K_1 R'_1 [I \mid -C'_1] = K_1[I \mid 0] \\ P'_2 = K_2 R'_2 [I \mid -C'_2] \end{cases} \text{with} \begin{cases} R'_2 = R_2 R_1^{-1} \\ C'_2 = R_1(C_2 - C_1) \end{cases} \quad (7)$$

i.e., the first camera's center is the origin, and camera 2 is related to camera 1 by rotation $R_2$ and translation $C_2'$.

One can specify the virtual view based on the canonical form. Suppose the camera matrix for the virtual view is:

$$P_0' = K_0' R_0' [I \mid -C_0'] \quad (8)$$

One can use $\alpha$ to parameterize the path between basis views 1 and 2. Equation (8) then becomes $$P_0'(\alpha) = K_0'(\alpha) R_0'(\alpha)[I \mid -C_0'(\alpha)] \quad (9)$$

For the camera intrinsic matrix, the gradual change from view 1 to view 2 may be viewed as camera 1 changing its focus and principal points gradually to those of camera 2 (if the two cameras are identical, then this will not have any effect, as desired). Thus, one may interpolate the intrinsic matrix and obtain $K_v'(\alpha)$ as:

$$K_0'(\alpha) = (1-\alpha)K_1 + \alpha K_2 \quad (10)$$

For $R_0'(\alpha)$, suppose $$R_i' = [r_i, s_i, t_i]^T \quad (11)$$

where $r_i$, $s_i$ and $t_i$ represent the x-axis, y-axis and z-axis, respectively. One may construct $R_0'(\alpha) = [r_0(\alpha), s_0(\alpha), t_0(\alpha)]$ as follows:

$$t_0(\alpha) = ((1-\alpha)t_1 + \alpha t_2)/\|(1-\alpha)t_1 + \alpha t_2\|$$

$$s' = (1-\alpha)s_1 + \alpha s_2$$

$$r_0(\alpha) = (s' \times t_0(\alpha))/\|s' \times t_0(\alpha)\|$$

$$s_0(\alpha) = t_0(\alpha) \times r_0(\alpha) \quad (12)$$

The first step in equation (12) constructs the new z-axis as the interpolation of two original z axes. Then one interpolates a temporary y-axis as s'. Note that s' may not be perpendicular to the new z-axis. But with it, one can construct a new x-axis ($r_0(\alpha)$) with the new z-axis and a temporary y-axis. Finally, one constructs the new y-axis as the cross product of the new z-axis and x-axis.

Finally, one can construct the new camera center using linear interpolation:

$$C_0'(\alpha) = (1-\alpha)C_1' + \alpha C_2' \quad (13)$$

From equation (13), the new camera center is on the line connecting the two camera centers, resulting in degeneracy for the epipolar constraint and thus one should not use it for virtual view synthesis (see FIG. 1). It is desirable to maintain the benefits derived from the constraint and thus want to avoid the degeneracy so that the fundamental matrix based method is still applicable. Thus one should move the path away from the exact line between the two views. This can be achieved by increasing slightly the y components of the virtual camera center computed from equation (13). In implementation, by increasing/decreasing the y component, one can further achieve the effect of changing the viewpoint perpendicular to the first direction. Suppose that $C_v(\alpha) = [x_v, y_v, z_v]$ one gets a new $C_v'(\alpha)$ as $$C_v'(\alpha) = [x_v, y_v + \gamma, z_v].$$

Figure 6:
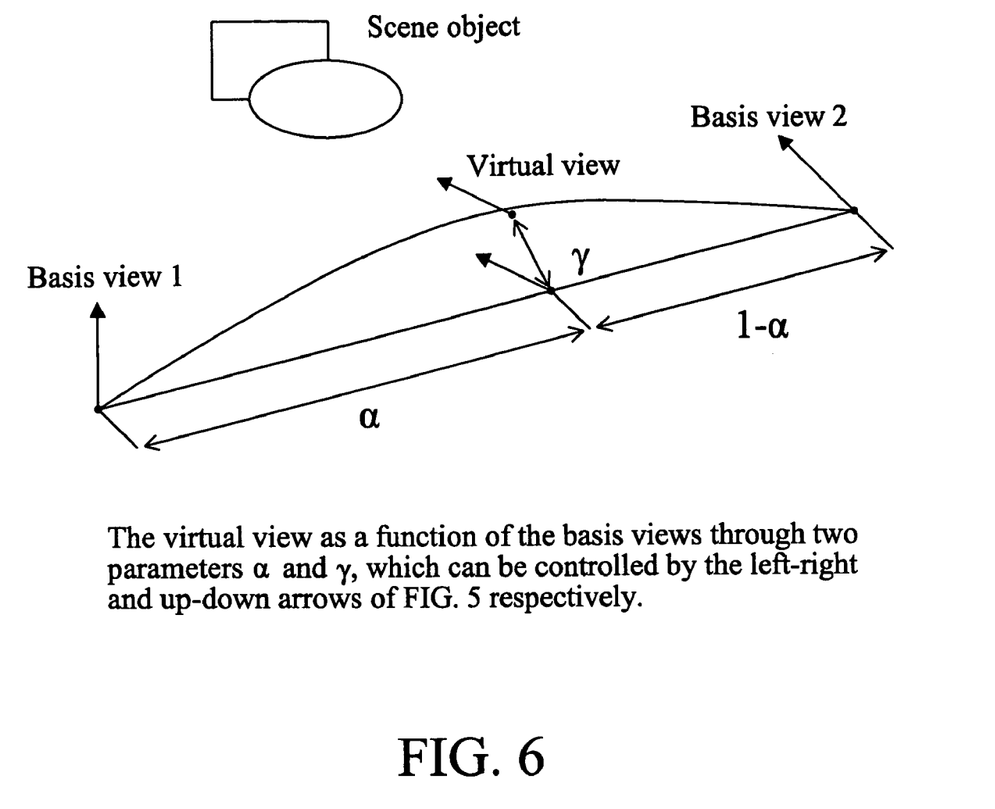
FIG. 6 illustrates virtual view as a function of the basis views.

This entire process is illustrated in FIG. 6. With the interpolated $P_0$, the corresponding fundamental matrices can be calculated and then used for virtual view synthesis.

Viewpoint Interpolation with Uncalibrated Image Capture

Now the uncalibrated case is considered, i.e., how we can achieve similar results from only the fundamental matrices. Given a fundamental matrix $F_{12}$ the corresponding canonical camera matrices are:

$$P_1 = [I \mid 0], P_2 = [[e']_x F_{12} + e'v^T \mid \lambda e'] \quad (14)$$

where e' is the epipole on image 2 with $F_{12}^T e' = 0$, v can be any 3-vector, and $\lambda$ is a non-zero scalar. Note that the reconstructed $P_2$ is up to a projective transformation. Apparently, a randomly-chosen v cannot be expected to result in a reasonable virtual view if the fundamental matrix is based on a $P_2$ defined by such a v. It is desirable to obtain the P's from an approximately estimated essential matrix. First the essential matrix by a simple approximation scheme is estimated. The essential matrix has the form:

$$E_{12} = K_2^{-1} F_{12} K_1 \quad (15)$$

For unknown camera matrices K, although auto-calibration can recover the focal length at the expense of tedious computation, it is not a practical option for the FTV application (unless the information is obtained at the acquisition stage). As an approximation, one sets the parameters of the camera matrix based on the image width w and height h:

$$f = (w+h)/2$$

$$p_x = w/2, p_y = h/2 \quad (16)$$

So K becomes:

$$K = \begin{bmatrix} f & 0 & p_x \\ 0 & f & p_y \\ 0 & 0 & 1 \end{bmatrix} \quad (17)$$

Further, one assumes that both cameras have similar configuration and use the same K to get the essential matrix $E_{12}$. An essential matrix can be decomposed into a skew-symmetric matrix and rotation matrix as:

$$E_{12} = [t]_x R \quad (18)$$

where R and t can be viewed as the relative rotation and translation matrix of camera 2 relative to 1. Now one has $$P_1 = K[I \mid 0], P_2 = K[R \mid t] \quad (19)$$

and thus the corresponding fundamental matrices can be recovered. This approach proved to be effective with multiple sets of data even if one has only an estimate in equation (16) without knowing the actual camera internal matrices.

Although it seems that one is going back to the calibrated case by estimating the essential matrix, the scheme is totally different from true full calibration. This is because one cannot expect to use the approximation of equation (16) for estimating the true rotation and translation that are needed for specifying the virtual as in the calibrated case. However, it is reasonable to use the approximation in the interpolation scheme as illustrated by equations (12) and (13).

Figure 7:
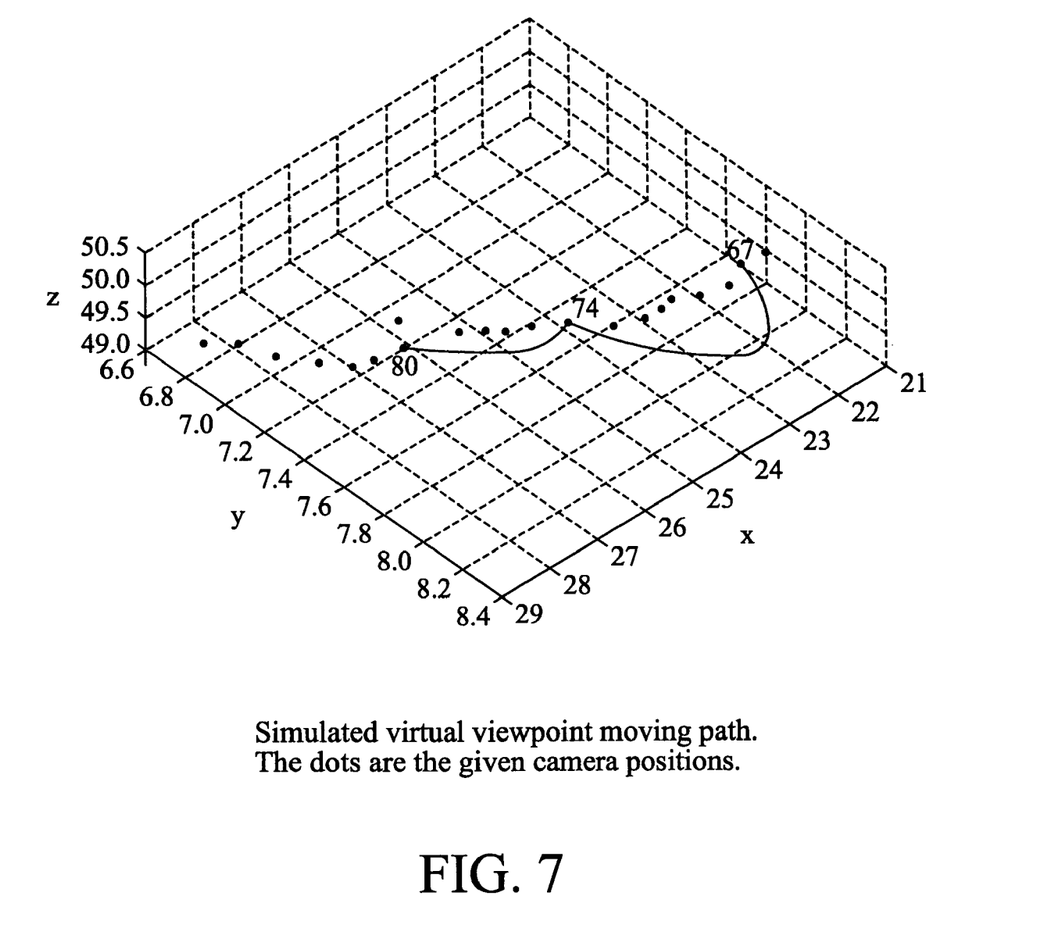
FIG. 7 illustrates simulated virtual viewpoint.
Figure 8:
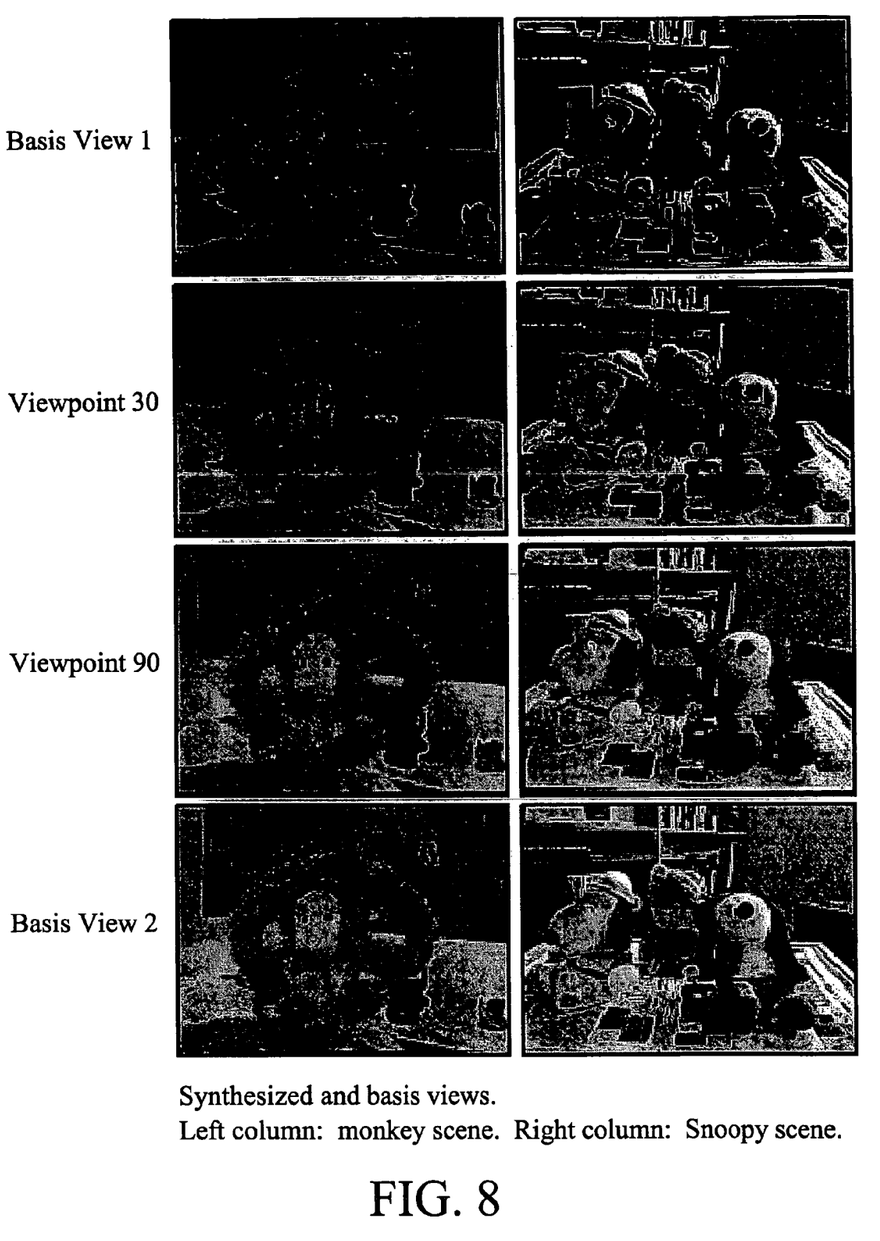
FIG. 8 illustrates synthesized and basis views.

A showing a simulated free viewpoint moving path by using data is shown in FIG. 7 as paths with viewpoint moving from camera 67 to 74 over a parabola and continuing to camera 80 following a piecewise linear curve. As an example, FIG. 8 (left) shows the two basis views and two examples of synthesized images of a monkey scene. The resulting synthesized virtual views of uncalibrated basis camera shots of a snoopy scene are shown in FIG. 8 (right). The preferred approach is capable of purely working from uncalibrated views without using any pre-calibration information, rendering it as a viable approach for practical FTV.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for synthesizing a viewpoint comprising:
    (a) receiving a first video stream of a scene having a first viewpoint;
    (b) receiving a second video stream having a second viewpoint wherein positional camera calibration between said first viewpoint and said second viewpoint is unknown;
    (c) a viewer selecting a viewer viewpoint generally between said first viewpoint and said second viewpoint;
    (d) synthesizing said viewer viewpoint based upon said first video stream and said second video stream using a disparity map that is constructed using the steps of:
        (i) segmenting an image from said first video stream into a plurality of segments, each said segment having a pixel height and a pixel width;
        ii) associating at least one of said plurality of segments with a respective associated segment of an image from said second video stream, said associated segment having the said pixel height and pixel width of the at least one of said plurality of segments, said associated segment automatically selected based on a score calculated by counting a number of corresponding pixel pairs, between said at least one segment and said respective associated segment, whose relative difference has a magnitude less than a threshold; and
        (iii) warping said at least one of said plurality of segments to said respective associated segment to construct said disparity map.

2. The method of claim 1 wherein said viewer selects said first viewpoint and said second viewpoint from a group of three of more video streams each of which has a different viewpoint.

3. The method of claim 1 further comprising receiving a third video stream having a third viewpoint, and a pair-wise positional calibration is calculated for each pair of said first, second, and third viewpoints.

4. The method of claim 3 further comprising selectively excluding said positional calibration of one of said viewpoints.

5. The method of claim 3 where the positional calibration calculated between each pair of video streams comprises a fundamental matrix between the respective pair, said fundamental matrix computed with a feature detector and a random sample consensus algorithm.

6. The method of claim 1 further comprising forward warping from said first and second viewpoints to said virtual view based upon a disparity map.

7. The method of claim 6 further comprising using a backward search based upon a third viewpoint to find a dominant and disparity consistent color.

8. The method of claim 1 wherein said threshold is 0.2.

9. The method of claim 6 wherein said disparity is based upon an epipolar constraint.

10. The method of claim 1 wherein said viewer viewpoint is specified by a translation and a rotation.

11. The method of claim 1 wherein said score is normalized by the number of pixels in said segment.

12. A method for synthesizing a viewpoint comprising:
    (a) receiving a first video stream from a user-selected first one of a plurality of cameras capturing a scene from a first viewpoint;
    (b) receiving a second video stream from a user-selected second one of a plurality of cameras capturing a scene from a second viewpoint;
    (c) a viewer selecting a virtual viewpoint generally between said first viewpoint and said second viewpoint;
    (d) synthesizing said virtual viewpoint based upon said first video stream and said second video stream using a disparity map that is constructed using the steps of:
        (i) segmenting an image from said first video stream into a plurality of segments, each said segment having a pixel height and a pixel width;
        (ii) associating at least one of said plurality of segments with a respective associated segment of an image from said second video stream, said associated segment having the said pixel height and pixel width of the at least one of said plurality of segments, said associated segment automatically selected based on a score calculated at least in part by counting a number of corresponding pixel pairs, between said at least one segment and said respective associated segment, whose relative difference has a magnitude less than a threshold; and
    (e) warping said at least one of said plurality of segments to said selected virtual viewpoint using said disparity map.

13. The method of claim 12 where said threshold is 0.2.

14. The method of claim 12 where said score is normalized by the number of said pixels in said segment.

15. The method of claim 12 including at least one auxiliary video stream different from each of said first and second video streams, and where said score is based on the maximum count of said corresponding pixel pairs, among said first video stream, said second video stream, and said at least one auxiliary video stream, whose relative difference is less than said threshold.

16. The method of claim 12 where said score is separately computed fro each of a plurality of color channels of said image.

17. The method of claim 16 where said score is used in an iterative optimization procedure that updates the matching score of each segment, based on its neighboring segments of similar color, in order to enforce disparity smoothness.

18. The method of claim 17 where said optimization procedure is based on:

$$S_{ij}^0(d) = m_{ij}(d)$$

$$r_{ij}^k(d) = \sum_{\phi} \sum_{d_0 \in (d-\Delta, d+\Delta)} S_{ij}^k(d_0)$$

$$S_{ij}^{k+1}(d) = S_{ij}^0(d) \left( \frac{r_{ij}^k(d)}{\sum_{d \in (d_{\min}, d_{\max})} r_{ij}^k(d)} \right)^\beta.$$

* * * * *

UNITED STATES PATENT AND TRADEMARK OFFICE
CERTIFICATE OF CORRECTION

PATENT NO. : 7,471,292 B2  
APPLICATION NO. : 11/462327  
DATED : December 30, 2008  
INVENTOR(S) : Baoxin Li Page 1 of 1

It is certified that error appears in the above-identified patent and that said Letters Patent is hereby corrected as shown below:

Col. 10, line 46 (Claim 16)
Change "computed fro" to --computed from--.

Col. 4, line 45

Change "
$$S_{ij}^{0}(d) = m_{ij}(d)$$
$$r_{ij}^{k}(d) = \sum_{\phi} \sum_{d_0 \in (d-\Delta, d+\Delta)} S_{ij}^{k}(d_0)$$
$$S_{ij}^{k-1}(d) = S_{ij}^{0}(d) \left( \frac{r_{ij}^{k}(d)}{\sum_{d \in (d_{min}, d_{max})} r_{ij}^{k}(d)} \right)^{\beta}$$
"

to --
$$S_{ij}^{0}(d) = m_{ij}(d)$$
$$r_{ij}^{k}(d) = \sum_{\phi} \sum_{d_0 \in (d-\Delta, d+\Delta)} S_{ij}^{k}(d_0)$$
$$S_{ij}^{k+1}(d) = S_{ij}^{0}(d) \left( \frac{r_{ij}^{k}(d)}{\sum_{d \in (d_{min}, d_{max})} r_{ij}^{k}(d)} \right)^{\beta}$$
--.

Signed and Sealed this

Thirty-first Day of March, 2009

JOHN DOLL  
*Acting Director of the United States Patent and Trademark Office*